United States Patent
Huston et al.

(10) Patent No.: US 9,371,096 B2
(45) Date of Patent: Jun. 21, 2016

(54) SYSTEM AND APPARATUS FOR UTILITY VEHICLE ACCESSORY MOUNTING

(71) Applicant: Club Car, LLC, Evans, GA (US)

(72) Inventors: Steven P. Huston, Evans, GA (US); Dean J. Long, Lakewood, FL (US); Joseph A. Cuadra, Jr., Oshkosh, WI (US); Nick L. Arndt, Waupun, WI (US); Samuel R. Lyons, Appling, GA (US)

(73) Assignee: Club Bar, LLC, Evans, GA (US)

( * ) Notice: Subject to any disclaimer, the term of this patent is extended or adjusted under 35 U.S.C. 154(b) by 3 days.

(21) Appl. No.: 14/512,746

(22) Filed: Oct. 13, 2014

(65) Prior Publication Data

US 2015/0123425 A1    May 7, 2015

Related U.S. Application Data (60) Provisional application No. 61/890,289, filed on Oct. 13, 2013.

(51) Int. Cl.
  *B60P 7/08*    (2006.01)
  *B62D 33/023*  (2006.01)
  *B60R 9/00*    (2006.01)

(52) U.S. Cl.
  CPC ............ *B62D 33/023* (2013.01); *B60P 7/0815* (2013.01); *B60R 9/00* (2013.01)

(58) Field of Classification Search
  CPC ......... B60P 7/08; B60P 7/0807; B60P 7/0815
  USPC .......................... 296/183.1; 410/77, 104, 105
  See application file for complete search history.

(56) References Cited

U.S. PATENT DOCUMENTS

| | | | |
|---|---|---|---|
| 4,270,681 A | 6/1981 | Ingram | |
| 4,934,572 A | 6/1990 | Bowman et al. | |
| 5,489,172 A * | 2/1996 | Michler | 410/104 |
| 6,024,402 A | 2/2000 | Wheatley | |
| 6,290,441 B1 | 9/2001 | Rusu | |
| 6,722,541 B1 | 4/2004 | Aftanas et al. | |
| 6,742,973 B1 | 6/2004 | Hendrix et al. | |
| 6,871,895 B2 | 3/2005 | Kiester et al. | |
| 7,785,053 B2 * | 8/2010 | Hudson | 410/105 |
| 7,845,887 B2 | 12/2010 | Smith | |
| 8,414,052 B2 | 4/2013 | Vertanen | |
| 8,474,756 B2 * | 7/2013 | Allain et al. | 244/118.6 |
| 8,668,181 B2 * | 3/2014 | Dazet et al. | 248/503.1 |
| 2004/0131439 A1 * | 7/2004 | Womack et al. | 410/104 |
| 2008/0025809 A1 * | 1/2008 | Ruan | 410/151 |
| 2008/0101883 A1 | 5/2008 | Derecktor | |
| 2009/0274531 A1 | 11/2009 | Townson | |
| 2013/0038087 A1 | 2/2013 | Woodard | |
| 2013/0256496 A1 * | 10/2013 | Majuhas | 248/503.1 |

OTHER PUBLICATIONS

International Search Report and Written Opinion, ISAUS, PCT/US14/060301, Jan. 29, 2015, 8 pgs.

\* cited by examiner

*Primary Examiner* — H Gutman
(74) *Attorney, Agent, or Firm* — Taft Stettinius & Hollister LLP (57) ABSTRACT

System and apparatus are disclosed for a cargo bed of a utility vehicle including side wall panels and a clamping device for mounting accessories. The cargo bed side panel includes a first protrusion and a second protrusion. The clamping device includes a first finger configured to engage the first protrusion and a second finger configured to engage the second protrusion, and an actuator configured to move the first and second fingers effective to secure the clamping device to the side panel.

18 Claims, 6 Drawing Sheets

SYSTEM AND APPARATUS FOR UTILITY VEHICLE ACCESSORY MOUNTING

BACKGROUND

The present application relates to mounting vehicle accessories on utility vehicle cargo beds and accessory mounts and cargo bed features relating to the same. Existing techniques typically involve either leaving an accessory unsecured, adding a rail system to the bed for accessory attachment, or permanently mounting accessory attachments to the floor bed or side walls of a cargo bed, for example, by bolting through the side walls or welding to the bed frame. These approaches suffer from a number of drawbacks and limitations including manufacturing time and cost and configuration inflexibility. Therefore, a need remains for further improvements in accessory mounting in utility vehicles.

SUMMARY

Unique apparatuses and systems for securing accessories in the cargo bed of a utility vehicle are disclosed. One exemplary embodiment includes a cargo bed side panel having a first protrusion and a second protrusion, a clamping mechanism having a first finger configured to engage the first protrusion and a second finger configured to engage the second protrusion, and an actuator configured to move the first and second fingers effective to secure the clamping device to the side panel. Further embodiments, forms, objects, features, advantages, aspects, and benefits shall become apparent from the following description and drawings.

DESCRIPTION OF ILLUSTRATIVE EMBODIMENTS

For the purposes of clearly, concisely and exactly describing exemplary embodiments of the invention, the manner and process of making and using the same, and to enable the practice, making and use of the same, reference will now be made to the Figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

Figure 1:
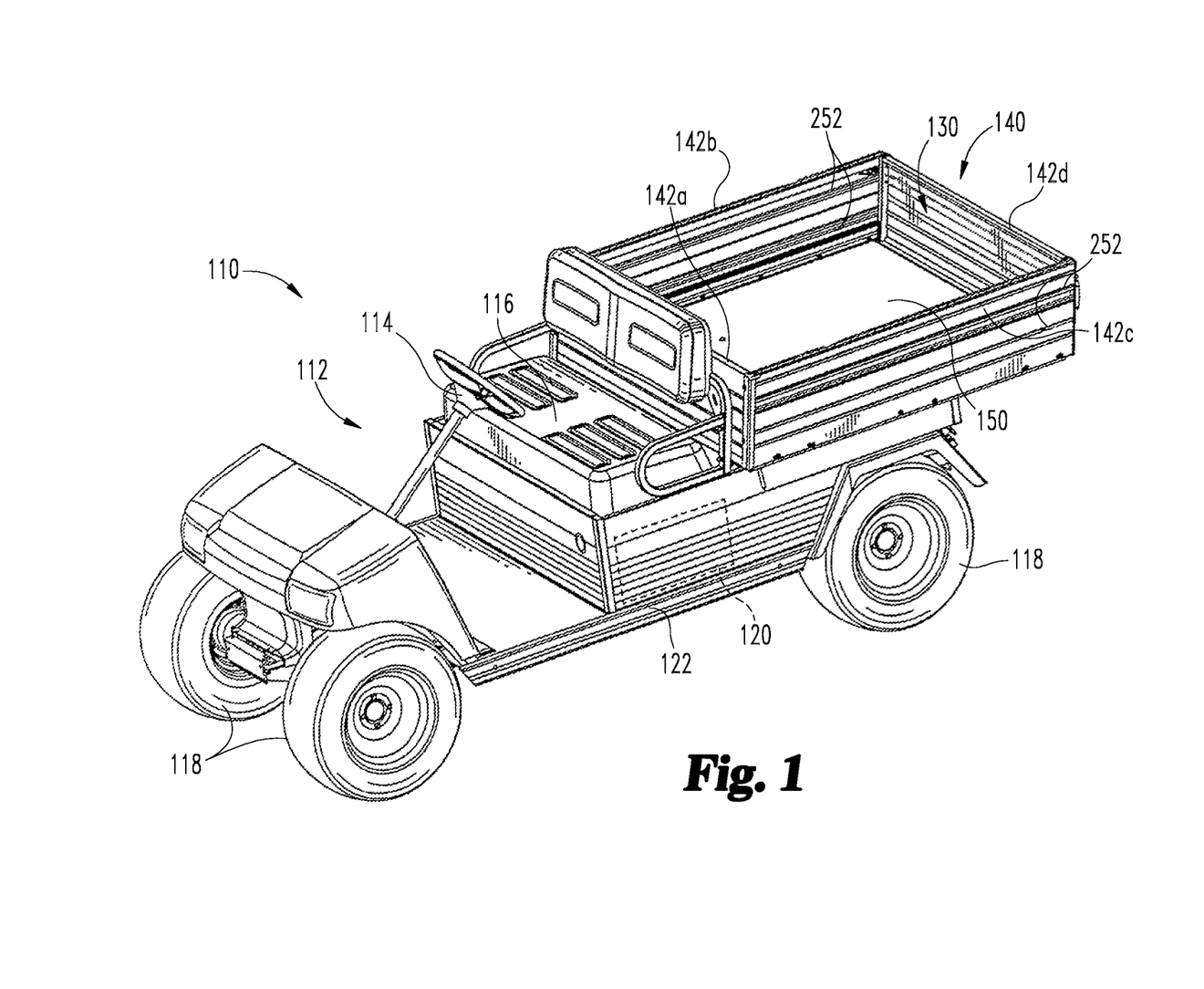
FIG. 1 is a perspective view of an exemplary utility vehicle.

With reference to FIG. 1, there is illustrated a utility vehicle 110 with a cargo bed 140 embodying the present invention. Exemplary utility vehicles include off-road vehicles having a cargo bed and low speed on-road vehicles having a cargo bed. The utility vehicle 110 includes a prime mover 120, four wheels 118, a frame 122, an operator zone 112, and the cargo bed 140. In certain embodiments, the prime mover 120 may be an internal combustion engine powered by diesel, propane, or natural gas to name a few types; however, other types of fuel sources are not precluded. In other non-limiting embodiments, the prime mover 120 may be a battery powered electric motor or a hybrid system including an engine powered by a fuel source and electricity. The prime mover 120 may include an array of hydraulic pumps and motors driven by the engine or motor. At least two of the four wheels 118 are driven by the prime mover 120 to propel the vehicle 110; all four wheels 118 are contemplated being driven, for example if the vehicle 110 is configured as a four-wheel-drive vehicle. Two of the wheels 118 (the front wheels in the illustrated embodiment) are used to steer the vehicle 110 while it is moving. The frame 122 of the vehicle 110 is supported by the wheels 118. The operator zone 112 is supported by the vehicle frame 122 and includes all parts of the vehicle 110 accessible by the operator of the vehicle during operation. The operator zone 112 includes a seat 116 for the operator and all of the controls, for example, pedals (not shown) and a steering wheel 114, used by the operator to operate the vehicle 110.

The cargo bed 140 includes a cargo floor 150, a front panel 142a, a right panel 142b, a left panel 142c, and a rear panel 142d. The front, right, left, and rear panels 142a, 142b, 142c, 142d may be referred to generically as the "side panels 142" of the cargo bed 140. A cargo space 130 is defined between the side panels 142 and above the cargo floor 150. The cargo floor 150 may be pivotally coupled to the rear of the vehicle 110 in a conventional manner, and pivotable to facilitate dumping cargo from the rear end of the cargo bed 140. In the illustrated embodiment, the side panels 142 include clamp engagement interfaces 252. In other embodiments, one or more of the side panels 142 can be a flat panel, or any other type of side panel suitable to form the cargo space 130.

Figure 2:
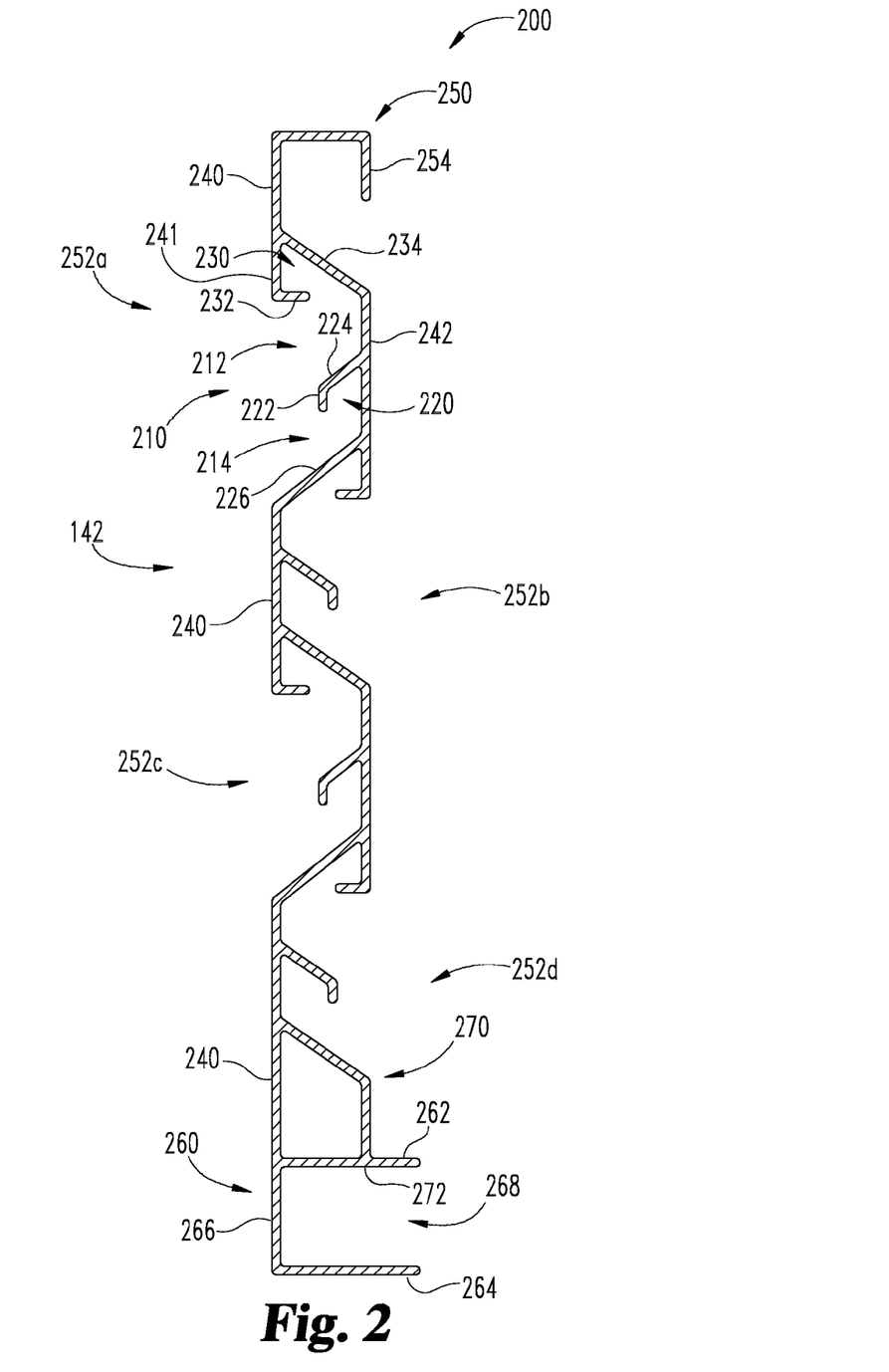
FIG. 2 is a cross sectional view of an exemplary side panel.

FIG. 2 illustrates a cross-section of an exemplary side panel 142. In the illustrated embodiment, the side panels 142 are aluminum extrusion material allowing for side wall features to be formed into the base during manufacturing, effectively incorporating the more complex side panel features into the cargo bed 140 components. The wall panel 200 includes a side wall surface 240 extending from an upper end 250 to a flange 260 that is generally C-shaped, with one or more clamp engagement interface(s) 252 a-d there between. Wall panel 200 may be a single piece, uniform in material composition throughout, and having a uniform cross section, as shown in FIG. 2. While aluminum and alloys provide a practical implementation strategy, in other embodiments alternative materials such as suitable plastic materials might be used.

The flange 260 includes a flange opening 268 to receive the cargo floor 150, a top leg 262 generally perpendicular to the side wall surface 240 that sits on the cargo floor 150, a bottom leg 264 generally perpendicular to the side wall surface 240 that sits under the cargo floor 150, and an end portion 266 intended for the cargo floor 150 to abut against. It should be appreciated that flange opening 268 can vary in height to support varying floor thicknesses. In other embodiments a different manner, or no manner, of fitted engagement with the cargo floor might be used. The wall panel 200 further includes a brace arm 270 protruding away from the side wall surface 240, which connects the side wall surface 240 to the top leg 262 of the flange 260 at a brace intersection 272 to further support the side wall 142.

The exemplary embodiment illustrated in FIG. 2 includes four (4) integrally formed clamp engagement interfaces 252

*a-d*: a first outwardly-opening clamp engagement interface 252*a*, a first inwardly-opening clamp engagement interface 252*b*, a second outwardly-opening clamp engagement interface 252*c*, a second inwardly-opening clamp engagement interface 252*d*. The clamp engagement interfaces 252*a-c*, may be substantially identical as illustrated, including mirror images, or may be of differing dimensions and configurations. For clarity of description, clamp engagement interfaces 252*a-c*, may be referred to generally as clamp engagement interfaces 252. Each clamp engagement interface 252 defines a channel 210 along its length, and the clamp engagement interface 252 is said to extend in the direction in which the channel 210 extends along the side of the wall panel 200.

As used herein, a clamp engagement interface 252 is said to open "inwardly" if the channel 210 opens toward the cargo space 130, and is said to open "outwardly" if the channel 210 opens away from the cargo space 130. It should be appreciated that a wall panel 200 may be configured in other embodiments with any arrangement and number of inwardly and/or outwardly clamp engagement interfaces 252.

In the exemplary embodiment in FIG. 2, each clamp engagement interface 252 includes the following elements (although only clamp engagement interface 252*a* is labeled with these elements for clarity of illustration): a wall or wall surface 242, a first arm 234 that extends away from the wall surface 242 at a substantially 45° angle, a first surface 241 that extends downward from the first arm 234; a second arm 226 extending from the first surface 242 at a substantially 45° angle, that connects with the wall or wall surface 240, a first lip 232 that protrudes in a generally perpendicular direction, a third arm 224 that protrudes substantially parallel to the second arm 226 away from the surface 242 at a position below the first lip 232 and above the second arm 226, and a second lip 222 that protrudes downward from the third arm 224 substantially coplanar to the surface 240 and the surface 242. It can be seen that directions of protrusion of lips 232 and 222 from an approximate right angle. Surface and wall or wall surface are terms used herein interchangeably. These elements of the clamp engagement interface 252 define channel 210 from a bottom side of the first lip 232 and the top of the second arm 226, and extending in and out of the page in FIG. 2. A first slot 212 and a second slot 214 are defined within the channel 210. The first lip 232 and the third arm 224 define a first slot 212, and the second lip 222 and the second arm 224 define a second slot 214. Within the first slot 212, the space between the first lip 232, the wall surface 240, and the first arm 234 defines a first cavity 230. Within the second slot 214, the space between the second lip 222, the third arm 224, and the first surface 242 defines a second cavity 220. Features 241 and 224, and the respectively attached lips, can be understood as protrusions, and each extend at least a majority of a length of panel 142 between first and second ends thereof.

Figure 3A:
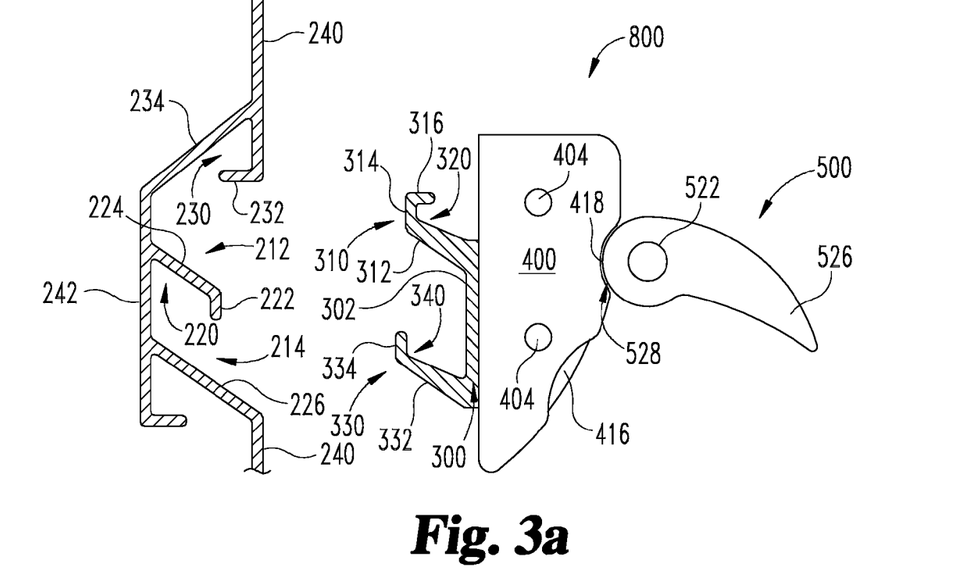
FIG. 3A is a cross-sectional view of an exemplary side panel further illustrating an exemplary clamping device before clamping to the sidepanel.
Figure 3B:
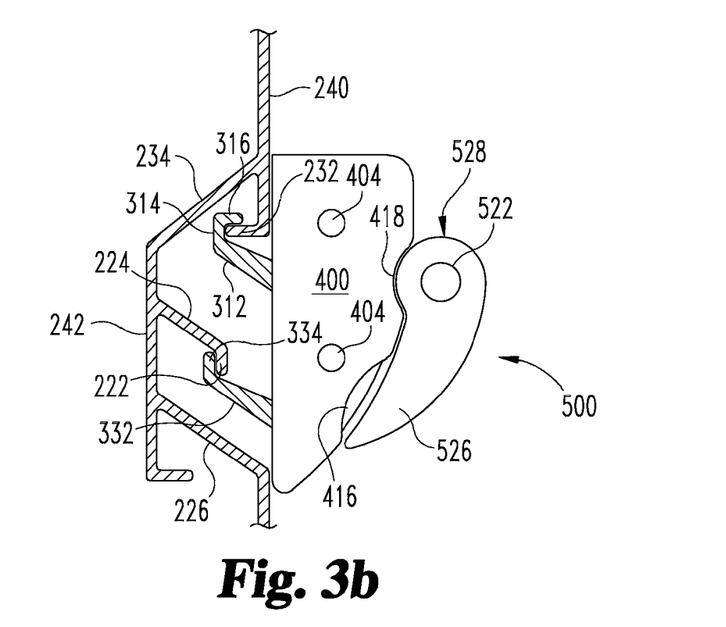
FIG. 3B is a cross-sectional view of an exemplary side panel further illustrating the exemplary clamping device clamped to the sidepanel.

FIGS. 3A and 3B illustrate an exemplary clamping device 800 for use in the clamp engagement interfaces 252 in the side panels 142. The clamping device 800 includes a handle 500, a body 400, and a clamping mechanism 300. The interoperability between the clamping device's elements will be described in further detail in connection with FIG. 4. The handle 500 is pivotally connected through an opening in the body 400 to the clamping mechanism 300 such that a user can lift or depress the handle 500 to disengage or engage, respectively, the clamping mechanism 300 with the clamp engagement interface 252. The handle 500 includes a handle base 528, a handle interface 526 that is user graspable, and a handle opening 522 extending through a handle base 528. The handle base 528 defines a substantially convex cammed surface configured to allow the handle 500 to actuate. The handle 500 may be rotatable in first and second directions, the significance of which will be apparent from the following description.

The body 400 includes a first depression 418 defining a concave surface with a substantially similar cam angle as the handle base 528 to allow the handle base 528 to actuate. The body 400 further includes a second depression 416 defining a concave surface to provide space for a user to grasp the handle interface 526 when the handle 310 is in a closed position (i.e. the handle interface 526 is abutted to the body 400 as illustrated in FIG. 3*b*) to move the handle 500 to an open position (as illustrated in FIG. 3*a*) without the use of tools.

An exemplary embodiment of the clamping mechanism 300 includes a first clamp finger 310 and a second clamp finger 330. First clamp finger 310 includes a first clamp finger arm 312 protruding from a clamping mechanism back side 302 at a substantially 45° angle, a first clamp finger leg 314 extending upward substantially parallel to the clamping mechanism back side 302, and a first clamp finger lip 316 extending in the direction of the clamping mechanism back side 302 substantially perpendicular to the first clamp finger leg 314. The first clamp finger arm 312, first clamp finger leg 314, and first clamp finger lip 316 define a first clamp finger cavity 320. The second clamp finger 330 includes a second clamp finger arm 332 positioned below the first clamp finger arm 310 and protruding from the clamping mechanism back side 302 at a substantially 45° angle, and a second clamp finger lip 334 extending upward substantially parallel to the clamping mechanism back side 302 in the same plane as the first clamp finger leg 314. The second clamp finger arm 332 and the second clamp finger lip 334 define a second clamp finger cavity 340.

Slots 212 and 214 provide access for the clamping mechanism 300 fingers 310 and 330, respectively, to be placed into the channel 210 of the clamp engagement interface 252 at a substantially perpendicular direction with the first surface 242. Cavities 230 and 220 provide space for the first clamp finger lip 316 and the second clamp finger lip 334, respectively, to be inserted at a substantially parallel direction with the first surface 242. The handle interface 526 can then be grasped by the user and to actuate the handle 500 to the closed position as illustrated in FIG. 3B. In the illustrated embodiment, the body 400 bears against the side wall surface 240 portions extending outside of the channel 210, the first clamp finger leg 314 and the first clamp finger lip 316 bear against the first lip 232, and the second clamp finger lip 334 bears against the second lip 222 to secure the clamping device 800 to the clamp engagement interface 252 and the side wall surface 240. When the clamping device 800 is secured to the side wall surface 240, the clamping device 800 will be substantially fixed via frictional interaction between abutting surfaces and immovable with respect to the clamp engagement interface 252, resisting movement of the device 800 with respect to the side panel 142. Handle 500 and its associated parts thus serve as an actuator moving fingers 310 and 330 toward and away from body 400, in response to rotating the handle 500 in first and second directions, and thus positioning fingers 310 and 330 in advanced or retracted positions.

Because the handle interface 526 portion of handle 500 is user graspable, the clamping device 800 can be both manually secured to the side wall surface 240 and released from the side wall surface 240 without the use of tools. In addition to the clamping force, lips 232 and 222 of the clamp engagement interface 252 bearing against the lips 316 and 334 of the clamping device 800 resist pivoting of the clamping device

800, keeping the clamping device 800 in a substantially parallel direction with the wall surface 240.

Figure 4:
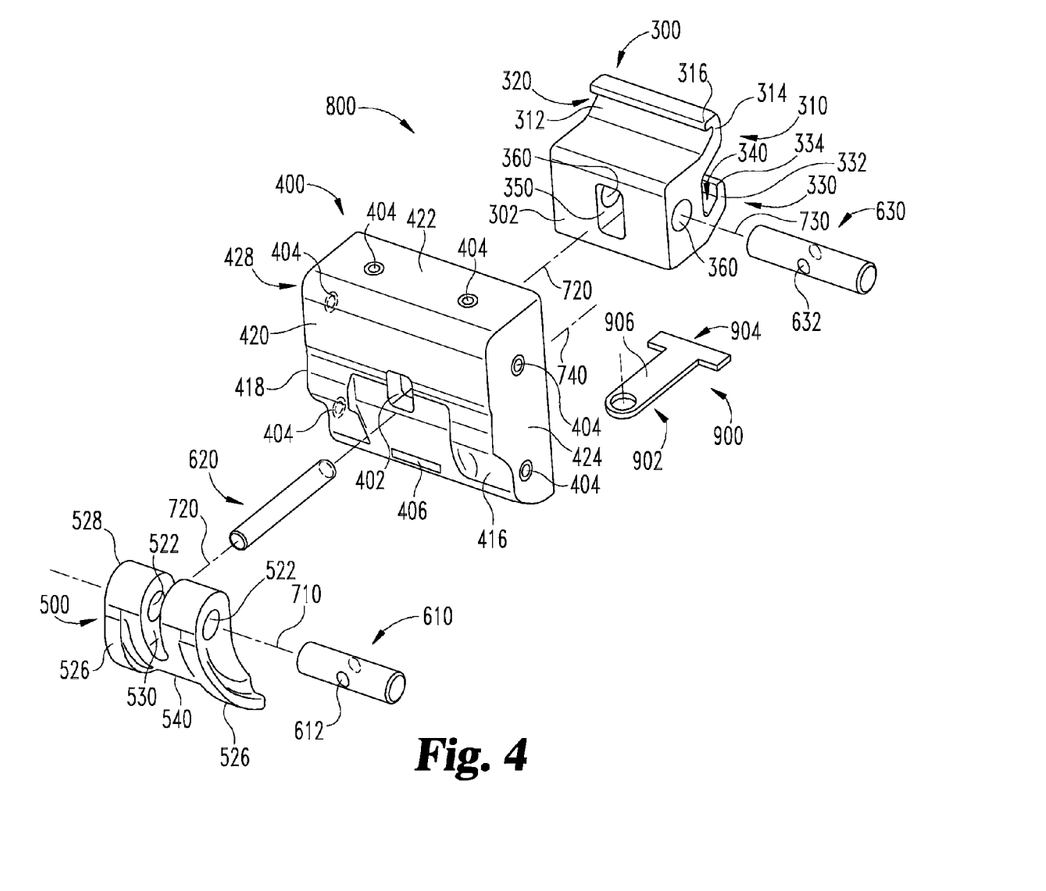
FIG. 4 is a an exploded view of an exemplary clamping device.
Figure 5:
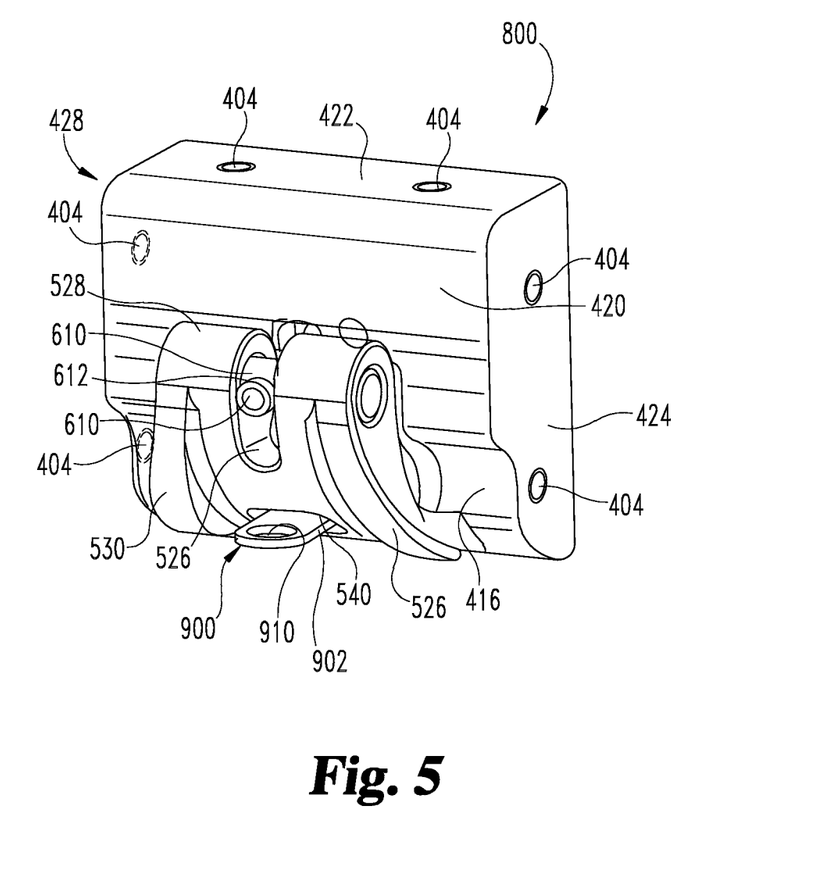
FIG. 5 is a front perspective view of an assembled exemplary clamping device.
Figure 6:
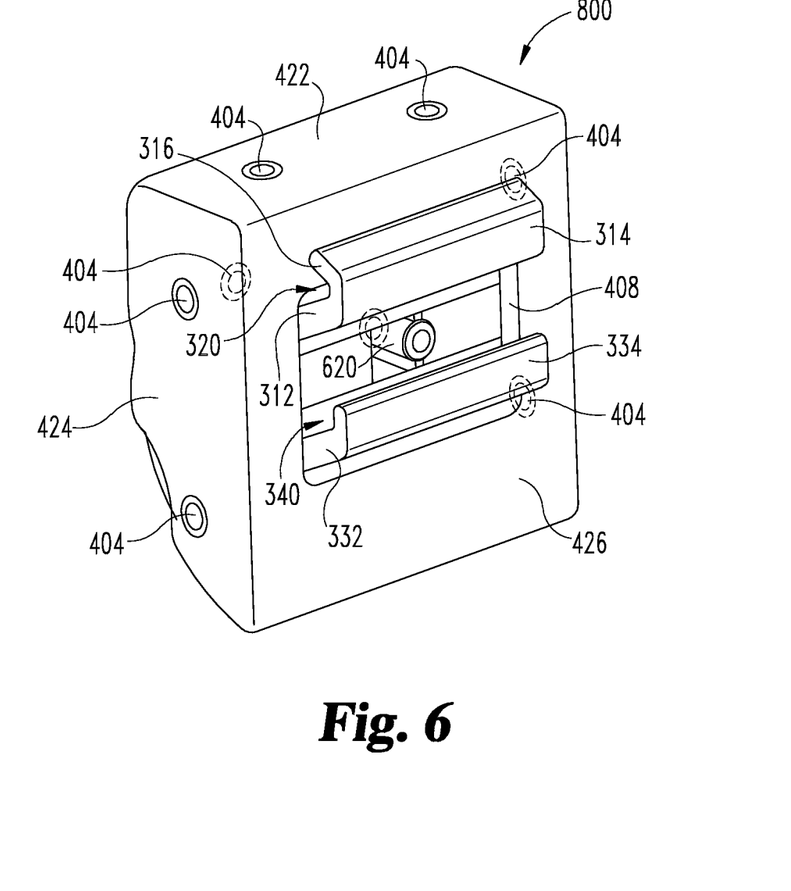
FIG. 6 is a back perspective view of an assembled exemplary clamping device.

FIG. 4 illustrates an exploded view of the elements of the clamping device 800 and FIGS. 5 and 6 illustrate the assembled views of the elements in the clamping device 800. The body 400 further includes one or more recessed holes 404 extending into the body 400 in a substantially perpendicular direction to the side of the body 400 to which the holes 404 open. The body 400 includes a pair of holes 404 on each of body sides 422, 424, and 428. The holes 404 are sufficiently recessed and configured to interface with and hold a variety of accessories intended to mount to the body 400 of the clamping device 800. One such non-limiting example of the accessories contemplated is an accessory to secure tools and other items to the side panels 142. A back side opening 408 of the body 400 is illustrated in FIG. 6. The back side opening 408 is sufficiently sized and shaped to house at least a portion of the clamping mechanism 300. Rather than or in addition to holes, accessory mounting features in the nature of hooks, eyes, or any other suitable contrivance might be used. Accessories mounted on one or more clamping devices 800 may be positioned anywhere in a range of locations along a length of the associated side panel, given the infinite number of possible positions of the clamping mechanism.

With continued reference to FIG. 4, the clamping device 800 further includes a handle pivot 610, a pull rod 620, and a block pin 630. The handle pivot 610 having a generally cylindrical shape includes a handle pivot opening 612 extending through the center of the handle pivot 610 on an axis 720 substantially perpendicular to the handle pivot 610. The handle pivot 610 is inserted through the handle opening 522 on an axis 710 substantially perpendicular to the handle opening 522, and the handle pivot 610 is positioned such that the handle pivot opening 612 is in the middle of a handle cavity 530.

The embodiment in FIG. 4 illustrates the pull rod 620 having a generally cylindrical shape is inserted into the handle pivot 610 through handle pivot opening 612 in the center of the handle cavity 530. The handle cavity 530 in the center of the handle base 528 is sufficiently recessed into the handle 500 such that handle 500 actuation is not inhibited by the pull rod 620. The pull rod 620 is further inserted through a body opening 402 that extends through the body 400 in a substantially perpendicular direction to a body front 420.

The block pin 630, illustrated in FIG. 4, has a generally cylindrically shaped body, and includes a block pin opening 632 that extends through the center of the block pin 630 at an axis perpendicular to the block pin 630. The block pin 630 is inserted through a side clamping mechanism opening 360 through the sides of the clamping mechanism 300 on an axis 730 substantially perpendicular to the sides of the clamping mechanism 300. The block pin 630 is inserted into the side clamping mechanism opening 360 such that the position of the block pin opening 632 is entirely accessible to the pull rod 620 extending through the body 400 and into a front clamping mechanism opening 350 such that the pull rod 620 can be inserted into the block pin opening 632. When the pull rod 620 is inserted through the handle pivot 610 and the block pin 630, the handle 500 is considered to be pivotally connected to the clamping mechanism 300 such that when the handle 500 is actuated it either pushes or pulls the pull rod 620, extending or retracting the clamping mechanism 300 from the body 400.

In some embodiments, the clamping device 800 may further include a lock plate 900. Lock plate 900, as illustrated in FIG. 4, is generally T-shaped. The clamping device 800 is configured such that when the lock plate 900 is inserted from the body back side 426 through a body opening 406 running substantially perpendicular to the body back side 426, the non-stem 904 portion of the lock plate 900 inhibits the handle 500 from pushing the pull rod 620, which under normal operating conditions pushes the clamping mechanism 300 away from the body 400, thereby releasing the clamping device 800 from the clamp engagement interface 252.

In certain embodiments, lock plate 900 has a lock plate hole 910 positioned toward the stem 902 portion of the lock plate. The lock plate hole 910 extends through the lock plate 900 in a direction substantially perpendicular to a top stem surface 906. As illustrated in FIG. 5, when the lock plate stem 902 is inserted through the body opening 406 the portion of the stem 902 with the lock plate hole 910 should be visible such that a locking mechanism can be inserted into the lock plate hole 910. One non-limiting example includes placing a locking mechanism into the lock plate hole 910 to prevent the clamping device 800 from being tampered with and disengaged from the clamp engagement interface 252. In an exemplary embodiment, the handle 500 has a groove 540 on the edge of the handle interface 526 aligning with the key plate 900 configured such that when a locking mechanism is inserted into the lock plate hole 910, the locking mechanism would abut against the handle 500, further preventing the handle 500 from actuating.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An apparatus for mounting accessories to a vehicle having a cargo bed comprising:
    a cargo bed side panel having a plurality of protrusions each extending at least a majority of a length of the side panel between a first end and a second end thereof;
    a clamping device including accessory mounting features and being positionable in engagement with the side panel anywhere in a range of locations along the length so as to position an accessory mounted thereon;
    the clamping device including a body, a plurality of fingers, and an actuator configured to move the plurality of fingers away from and toward the body between an advanced position, for unclamping the clamping device from the side panel, and a retracted position, respectively; and
    the plurality of protrusions extending in parallel and being spaced vertically from one another so as to form a clamping device engagement interface, and the plurality of fingers being in the retracted position, such that the clamping device is aligned with and clamped to the engagement interface and the plurality of fingers are engaged with the plurality of protrusions to resist movement of the clamping device with respect to the side panel, wherein the clamping device further includes a handle and a pull rod, the handle is pivotally connected to the pull rod, and the pull rod extends through an opening in the body and is pivotally coupled to the plurality of fingers with a block pin extending through the clamping device, wherein the block pin includes a block pin body that extends perpendicular to the pull rod and a block pin opening extending through a center of the block pin body on axis perpendicular to the block pin body for receiving the pull rod.

2. The apparatus of claim 1, wherein the plurality of fingers form a clamping mechanism of the clamping device sized and shaped to be inserted into a channel formed in the side panel, and wherein a first one of the plurality of fingers is sized and shaped to be inserted into a first slot within the channel, and a second one of the plurality of fingers is sized and shaped to be inserted into a second slot within the channel.

3. The apparatus of claim 1, wherein the handle is rotatable in a first direction to push the plurality of fingers away from the body for decoupling the clamping device from the side panel, and in a second direction to pull the plurality of fingers toward the body for clamping the clamping device to the side panel.

4. The apparatus of claim 3, wherein the handle being rotated in the second direction causes the body to bear against the clamping device engagement interface, the first clamping device finger to bear against the first lip, the second clamping device finger to bear against the second lip, and the body to bear against the wall surface, and wherein actuation of the handle in the first direction releases the clamping device from the device engagement interface.

5. The apparatus of claim 1, further comprising a lock plate sized and shaped to be inserted into and through an opening on the body with a portion of the lock plate projecting out of the body;
wherein the lock plate is configured to prevent the handle from actuating when the lock plate is inserted into the body via blocking the clamping device from being disengaged from the clamp engagement interface; and
wherein the lock plate further comprises an opening in the portion of the lock plate projecting out of the body such that a locking mechanism can be inserted so as to prevent the clamping device from being disengaged from the engagement interface.

6. The apparatus of claim 1, wherein the side panel is extruded so as to form alternating clamping engagement interfaces opening inwardly and outwardly with respect to a cargo space defined in part by the side panel, such that clamping devices may be mounted on opposite sides of the side panels for attachment of objects both inside and outside of the cargo space.

7. The apparatus of claim 1 comprising a plurality of cargo bed side panels and a cargo floor defining a cargo space, and wherein each side panel defines oppositely facing first and second vertical surfaces, and wherein each of the side panels includes a clamping engagement interface formed in each of the first and second vertical surfaces.

8. The apparatus of claim 1, further comprising a handle pivot including a handle pivot body and a handle pivot opening extending through the center of the handle pivot body on an axis perpendicular to the handle pivot body;
the handle further comprising a first handle side, a second handle side, a handle cavity extends from the handle base defining an opening between the handle top and the handle bottom through a portion of the handle, and a handle interface;
wherein the handle pivot is sized and shaped such that it can be inserted through the first and second handle openings, and the handle pivot opening is positioned to reside in the middle of the handle cavity;
wherein the block pin is sized and shaped to be inserted into an opening through the clamping device;
wherein the pull rod is sized and shaped for the first pull rod end to be inserted into the handle pivot opening and the second pull rod end to be inserted into the block pin opening, wherein the pull rod is further sized and shaped to extend through a body opening extending through the body.

9. The apparatus of claim 8, wherein the handle further comprises a handle base with a cammed surface angled to engage the body of the clamping device with the clamp engagement interfaces when the handle interface is in a closed position and disengage the clamping device from one of the clamp engagement interfaces when the handle interface is actuated in an open position;
wherein actuation of the handle interface to the closed position causes the handle pivot to move toward the body, pulling the clamping mechanism toward the body;
wherein actuation of the handle interface to the open position causes the handle pivot to move away from the body, pushing the clamping mechanism away from the body.

10. An apparatus for mounting accessories to a vehicle having a cargo bed comprising:
a cargo bed side panel having a plurality of protrusions each extending at least a majority of a length of the side panel between a first end and a second end thereof;
a clamping device including accessory mounting features and being positionable in engagement with the side panel anywhere in a range of locations along the length so as to position an accessory mounted thereon;
the clamping device including a body, a plurality of fingers, and an actuator configured to move the plurality of fingers away from and toward the body between an advanced position, for unclamping the clamping device from the side panel, and a retracted position, respectively; and
the plurality of protrusions extending in parallel and being spaced vertically from one another so as to form a clamping device engagement interface, and the plurality of fingers being in the retracted position, such that the clamping device is aligned with and clamped to the engagement interface and the plurality of fingers are engaged with the plurality of protrusions to resist movement of the clamping device with respect to the side panel, wherein the clamping device engagement interface includes a wall surface, a first arm extending away from the wall surface, a first surface extending downward from the first arm in a substantially parallel direction with the wall surface, a second arm extending away from the first surface and connecting with the wall surface, a first lip protruding away from the wall surface in a generally perpendicular direction at a position below the first arm, a third arm protruding away from the first surface at a position below the first lip and above the second arm, a second lip protruding downward from the third arm substantially coplanar to the wall surface and the first surface;
wherein the first lip and the second leg define a channel;
wherein the first lip and the third leg define a first slot;
wherein the second lip and the second leg define a second slot;
wherein the first lip, the wall surface, and the first arm form a first cavity; and
wherein the second lip, the third leg, and the first surface form a second cavity.

11. A clamping device for use in a cargo bed having a plurality of protrusions forming a clamping device engagement interface adapted to align with the clamping device, comprising:
a handle, a body, a clamping mechanism with a plurality of fingers, and a pull rod interconnecting the handle, body, and clamping mechanism;

wherein the clamping mechanism is sized and shaped to be inserted into the clamping device engagement interface, and once within the clamping device engagement interface, the handle actuated such that the plurality of fingers bears against the device engagement interface, wherein the clamping mechanism further includes a back side and the plurality of fingers includes a first finger positioned above a second finger;

wherein the first finger comprises a first arm extending from the back side, a first leg substantially parallel to the back side extending from the first arm, and a first lip extending toward the back side from the first leg;

wherein the second finger comprises a second arm extending from the back side, a second lip substantially parallel to the back side extending from the second arm; and wherein the first leg and the second lip are substantially coplanar.

12. The clamping device of claim 11, wherein the handle includes a handle base with a cammed surface to allow the pull rod to actuate such that the clamping mechanism is extended or retracted in a substantially similar direction as the pull rod actuation.

13. The clamping device of claim 12, wherein the clamping handle may be actuated without tools in a first direction to pull the pull rod to draw the first and second fingers into contact with the clamping device engagement interface such that the clamping device is rigidly attached to the clamping device engagement interface;

wherein the clamping handle may be actuated without tools in a second direction to push the pull rod to release a clamping force between the first and second fingers and the clamping device engagement interface, such that the clamping device may be repositioned along the clamping device engagement interface to a desired location.

14. The clamping device of claim 13, wherein the body further comprises a plurality of openings recessing inward of the body.

15. A utility vehicle cargo bed system comprising:

a cargo bed including a floor and at least one side panel, the side panel including a first protrusion including a first engagement portion extending over a first distance at a first angle relative to the floor and a second protrusion including a second engagement portion extending over a second distance at a second angle relative to the floor, the second angle being different from the first angle; and a clamping device including a clamp body, a first finger moveable relative to the clamp body, a second finger moveable relative to the clamp body, and an actuator configured to move the first finger and the second finger inward and outward relative to the clamp body;

wherein when the actuator is actuated to engage the clamping device with the side panel, the first engagement portion engages the first finger to apply force in a first direction to force the clamp body toward the side panel and a second direction differing from the first direction and the second engagement portion engages the second finger to apply force in the first direction and a third direction opposing the second direction.

16. The system of claim 15, wherein when the actuator is actuated to engage the clamping device the second finger hooks around the second engagement portion to resist upward movement, downward movement and outward movement of the clamping device relative to the side panel.

17. The system of claim 16, wherein the second direction is generally upward relative to the floor and the third direction is generally downward relative to the floor.

18. The system of claim 17 wherein the first protrusion further includes a third engagement portion extending over a third distance at a third angle relative to the floor, the third angle being different than the first angle;

wherein the first finger extends a first distance at the first angle and a second distance at the third angle;

wherein the second protrusion further includes a fourth portion extending over a fourth distance at a fourth angle relative to the floor, the fourth angle being different from the second angle; and wherein the second finger extends a second distance at the second angle and a fourth distance at the fourth angle.

* * * * *